UNITED STATES PATENT OFFICE.

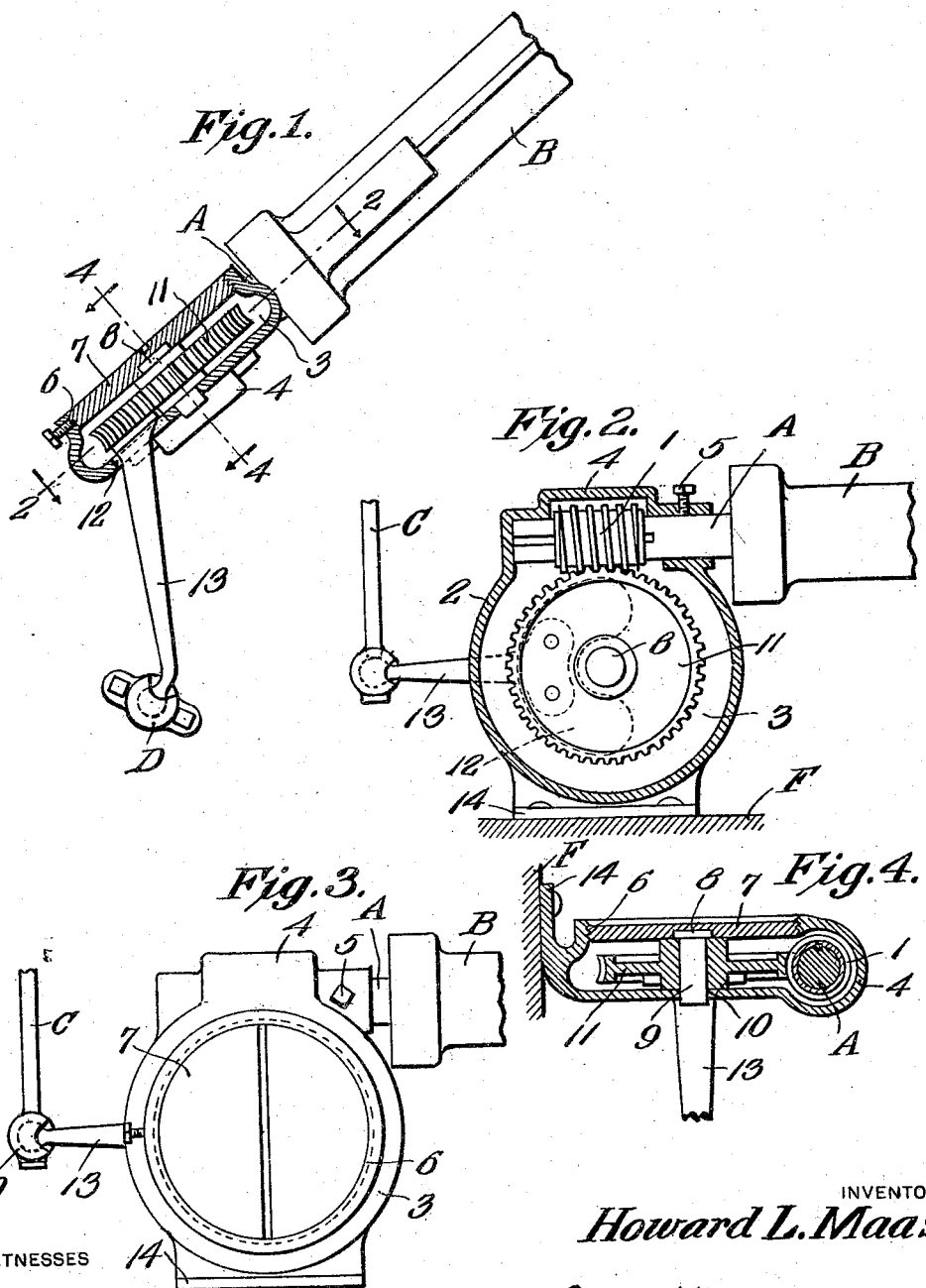

HOWARD L. MAAS, OF ENDICOTT, NEW YORK.

AUTOMOBILE ATTACHMENT.

1,277,620.  Specification of Letters Patent.  Patented Sept. 3, 1918.

Application filed April 28, 1917. Serial No. 165,253.

*To all whom it may concern:*

Be it known that I, HOWARD L. MAAS, a citizen of the United States, residing at Endicott, in the county of Broome and State of New York, have invented certain new and useful Improvements in Automobile Attachments, of which the following is a specification.

This invention relates to an automobile attachment, and more particularly to an improved device for attachment to the steering mechanism of a Ford automobile.

The primary object of the invention is to substitute gearing mechanism on the end of the steering post for the steering arm now mounted on the standard type of Ford automobile or, more particularly, to the type known as the Model T.

Another object of the invention is to provide an improved construction that may be easily associated with the steering mechanism so that the strain incident to the driving of the automobile may be materially decreased, and practically obviated by eliminating the direct lever connection between the steering post and the connecting rod which turns the wheels.

A further object of the invention is to provide a construction of this character that will eliminate the possibility of turning the front wheels of the automobile, unless the steering wheel itself is operated to accomplish this turning.

A further object of this invention is the provision of an automobile attachment which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which;

Figure 1 is a side elevation showing the attachment applied to the end of the steering post, the attachment being shown partly in section.

Fig. 2 is a section on the line 2—2 of Fig. 1 looking in the direction indicated by the arrow.

Fig. 3 is a top plan view of the attachment.

Fig. 4 is a transverse section on the line 4—4 of Fig. 1.

In the Ford automobile, the end of the steering post, indicated at A, projects for a short distance beyond the end of the steering column B and in the type of machine now being produced, namely the Model T, the projecting portion A of the steering post carries a steering arm which extends downwardly and is fixed by a ball and socket joint to the end of a connecting rod C, whereby the wheels may be turned in the usual manner when the steering post is turned by the steering wheel. My invention contemplates simply removing the arm from the extended end A of the steering post and substituting therefor an ordinary worm 1 which may be slipped over the end of the steering post A and fixed thereto in any preferred manner. Mounted upon the extended end A of the steering post and embracing the worm 1 is a casing 2 which has a relatively large circular portion 3 extending to one side of the portion which embraces the post and the worm 1. This casing, as shown by Fig. 1 of the drawing, is disposed at the same angle as the steering post. The cylindrical portion 4 of the casing is of a diameter large enough to embrace the worm, while the end portions fit snugly around the extended end A of the post and a set screw 5 is employed to hold the casing on the post. The top of the circular portion 3 of the casing is provided with a large screw threaded opening 6 in which is received a cover plate or cap 7, the top surface of which is slotted for the purpose of receiving a screw-driver or the like to remove or replace the cap. The inner side of the cap has a circular depression which receives a circular head 8 formed on the end of a pivot pin 9, the opposite end of which is projected slightly through an opening 10 formed in the opposite side of the casing. This structure supports the pin 9 in the direct center of the casing, and it may be easily removed when the cap 7 is removed from its position.

Mounted upon the pin 9 is a worm gear 11, the teeth of which are in mesh with the threads of the worm 1, so that a rotary movement of the worm will be imparted to the worm gear for rotating the latter. It is to be noted, however, that the diameter of the worm gear is considerably larger than the diameter of the worm, and the pitch of the threads on the worm will permit a comparatively small movement of the worm gear when the worm is rotated once. It will be obvious, therefore, that several rotations must be given to the steering wheel to rotate the worm gear for any appreciable distance.

The bottom of the casing is provided with an arcuate slot 12, while extending through the slot and fixed to the web of the worm gear is a steering arm 13. This arm depends from the gear through the slot 12 in an almost vertical line, when in normal position, and the other ball end of the arm is connected to the connecting rod C by a suitable ball and socket joint D that may be of any suitable construction. The connecting arm C, of course, will be joined in the usual manner to the steering levers associated with the wheels of the automobile, this construction remaining the same as it is without the attachment.

The casing is provided, at a point diametrically opposite to the worm, with a flange 14 which is to be attached to the adjacent portion of the frame F, so that the casing will be supported rigidly in operative position to provide an efficient bearing for the gear and the steering arm, thus producing the necessary rigidity that is required in devices of this character.

From the foregoing it will be observed that a very simple and durable automobile attachment has been provided, the details of which embody the preferred form. I desire it to be understood, however, that slight changes in the minor details of construction may be made without departing from the spirit of the invention or the scope of the claims hereunto appended.

I claim:

1. The combination with the extended end of a steering post, a worm mounted on the post, a worm gear meshing with the worm, a casing fixed to the post and embracing the said gear, the casing having an arcuate slot formed therein, and a steering arm fixed to the gear and movable therewith and extending through the said slot.

2. The combination with the extended end of a steering post, a worm mounted on the post, a worm gear meshing with the worm, a casing fixed to the post and embracing the said gear, the casing having an arcuate slot formed therein, a steering arm fixed to the gear and movable therewith and extending through the said slot, the said casing having a cylindrical portion enveloping the said worm, and a flange carried by the casing and adapted to be fixed to the frame of the automobile.

3. The combination with the extended end of a steering post, a worm mounted on the post, a worm gear meshing with the worm, a casing fixed to the post and embracing the said gear, the casing having an arcuate slot formed therein, a steering arm fixed to the gear and movable therewith and extending through the said slot, the said casing having a cylindrical portion enveloping the said worm, the said casing having a relatively large opening formed therein, a cap received in the opening and removable for inserting and removing the said gear from the casing.

4. The combination with the extended end of a steering post, a worm mounted on the post, a worm gear meshing with the worm, a casing fixed to the post and embracing the said gear, the casing having an arcuate slot formed therein, a steering arm fixed to the gear and movable therewith and extending through the said slot, the said casing having a cylindrical portion enveloping the said worm, the said casing having a relatively large opening formed therein, a cap received in the opening and removable for inserting and removing the said gear from the casing, the said cap having a recess formed in its inner side, and a pin receiving the said gear and received in the recess in the said cap.

In testimony whereof I affix my signature in presence of two witnesses.

HOWARD L. MAAS.

Witnesses:
ALBERT M. DETRICK,
RAYMOND MAAS.

Copies of this patent may be obtained for five cents each, by addressing the "Commissioner of Patents, Washington, D. C."